United States Patent [19]

De Bosio

[11] Patent Number: 4,939,721
[45] Date of Patent: Jul. 3, 1990

[54] NODE FOR A FAST PACKET-SWITCHING NETWORK IN OPTICAL-ELECTRICAL TECHNOLOGY

[75] Inventor: Alfredo De Bosio, Turin, Italy

[73] Assignee: CSELT- Centro Studi e Laboratori Telecommunicazioni SpA, Milan, Italy

[21] Appl. No.: 297,573

[22] Filed: Jan. 13, 1989

[30] Foreign Application Priority Data

Feb. 29, 1988 [IT] Italy ............................... 67151-A/88

[51] Int. Cl.$^5$ ................................................. H04J 3/26
[52] U.S. Cl. ..................................... 370/60; 370/94.2; 370/4
[58] Field of Search .................. 370/60, 58, 1, 4, 94.1, 370/94.2; 455/600; 350/13, 14, 15

[56] References Cited

U.S. PATENT DOCUMENTS

| | | | |
|---|---|---|---|
| 4,397,016 | 8/1983 | Broussaud | 370/4 |
| 4,696,059 | 9/1987 | MacDonald et al. | 455/600 |
| 4,731,878 | 3/1988 | Vaidya | 370/1 |
| 4,736,462 | 4/1988 | Joel, Jr. | 455/600 |
| 4,829,512 | 5/1989 | Nakai et al. | 370/16 |
| 4,837,855 | 6/1989 | Hajikano et al. | 455/600 |

Primary Examiner—Douglas W. Olms
Assistant Examiner—Min Jung
Attorney, Agent, or Firm—Herbert Dubno

[57] ABSTRACT

A node for a fast packet-switching network in optical-electrical technology comprises an optical switching matrix and electrical control equipment which processes the signalling and the information packet headers. More particularly, the control equipment updates the label and, depending on such a label, searches for the routing through the node. A centralized node controller processes the signalling, while a distributed processing system processes the packet headers and routes the packets through the network. For all communications in progress, the distributed processing system periodically forwards routing requests to an electrical self-routing switching matrix associated with the optical matrix. When a connection path has been found between an input and an output of the electrical matrix, the same path is reproduced in the optical matrix and the packets are transferred to the node output through the optical matrix.

11 Claims, 3 Drawing Sheets

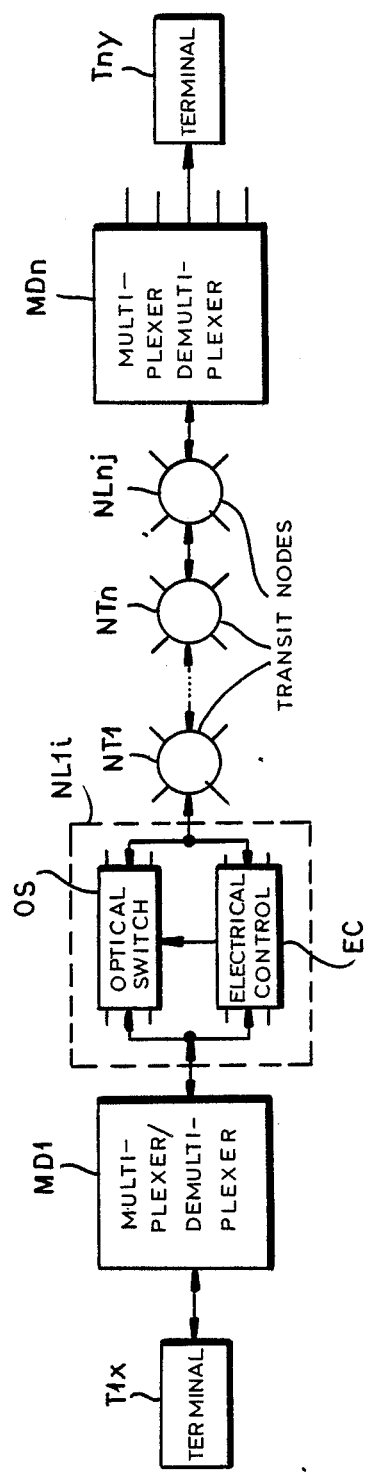
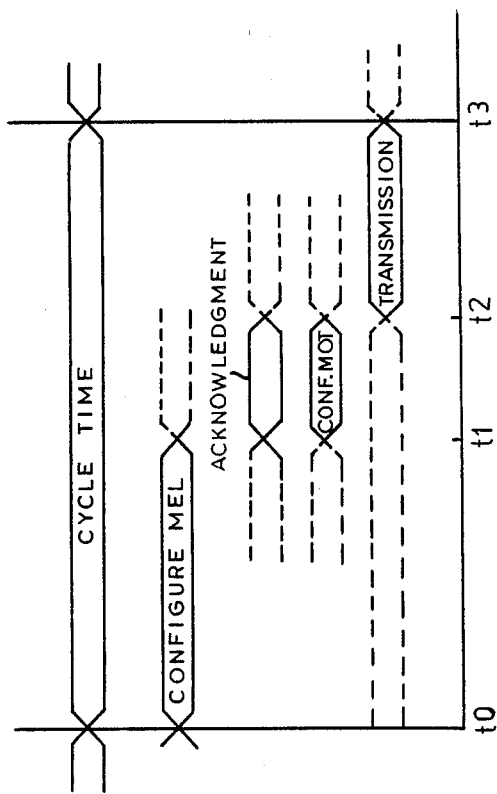
FIG.1
FIG.3

NODE FOR A FAST PACKET-SWITCHING NETWORK IN OPTICAL-ELECTRICAL TECHNOLOGY

FIELD OF THE INVENTION

The present invention relates to a packet-switching telecommunications system and, more particularly, to a node for a fast packet-switching network in optical-electrical technology.

BACKGROUND OF THE INVENTION

Fast packet-switching, known also as label-addressed switching or asynchronous time-division switching, is a digital information switching technique wherein information blocks, which are associated with a label characterizing the information and which arrive at random instant at the switching devices, are switched solely on the base of the label contents. This technique allows considerably improved performance by comparison with conventional packet switching, particularly with respect to protocol simplicity, information processing speed and flexibility. For these reasons it is the most promising switching technique for implementing a broadband integrated service network where the bandwidth requirements of the individual communications are met while respecting their time constraints, and the information is switched independently of the service type.

In implementing a broadband network, the use of optical technology appears an obvious solution, and it is desirable to use such technology not only for transmission between network nodes, but also for switching in the nodes. Thus all optical-to-electrical conversions and vice versa can be dispensed with.

A totally optical fast packet-switching network requires optical switching matrices and optical processing means to carry out the operations relevant to node management and, more particularly, signalling handling and routing.

Optical switching matrices to be used in time-division or space-division circuit-switching systems are largely described in the literature. For instance, the paper "Photonic switching using direction couplers" by H. S. Hinton, IEEE Communications Magazine, Vol. 25, No. 5, May 1987, describes optical switching matrices based on switching elements with two inputs and two outputs. These elements can be used also for implementing self-routing switching matrices, e.g. with Omega or Delta topology better suited to fast packet switching, as described in the paper "Access and Alignment of Data in an Array Processor" by D. H. Lawrie, IEEE Transactions on Computers, Vol. C-25, Dec. 1975, pages 1145 and ff.

By contrast optical processing means having the processing capacity necessary for managing the nodes of a network of the type considered do not yet exist, even though at least relatively simple processing means, capable of controlling the routing through the optical switching matrix, might be available in the future. Therefore, at the present time, the most realistic solution to the problem of introducing the optical technology into a fast packet-switching network seems the use of optical fiber connections between the nodes and of electrically-controlled optical switching matrices within the nodes.

OBJECT OF THE INVENTION

Fast packet-switching networks combining optical switching and electrical control have not previously been known in the art and it is the object of the invention to provide a node for a network of this type.

SUMMARY OF THE INVENTION

The node according to the invention comprises:

an optical switching matrix, comprising a plurality of stages, each comprising a plurality of switching elements, for switching information packets transmitted as optical signals;

an electrical switching matrix which is used for searching a routing through the node by exploiting information contained in the headers of the information packets and converted into electrical form, the configuration taken by the electrical switching matrix being reproduced in the optical switching matrix;

a first group of processing devices associated with the inputs of the electrical switching matrix for the electrical processing of the headers of the information packets, necessary to search a connection path between an input and an output of the electrical switching matrix, and for updating the headers in the optical information packets;

a second group of electrical processing devices associated with the outputs of the electrical switching matrix for detecting the setup of a connection between an input and an output of the electrical switching matrix and forwarding an acknowledgment packet of such a setup to the processing devices in the first group;

a centralized node controller for the electrical processing of signalling packets.

BRIEF DESCRIPTION OF THE DRAWING

The invention will be better understood with reference to the annexed drawings, wherein:

FIG. 1 is a block diagram of which shows the general structure of a fast packet-switching network;

FIG. 3 is a schematic diagram of the node operating phases; and

SPECIFIC DESCRIPTION

Figure 2:
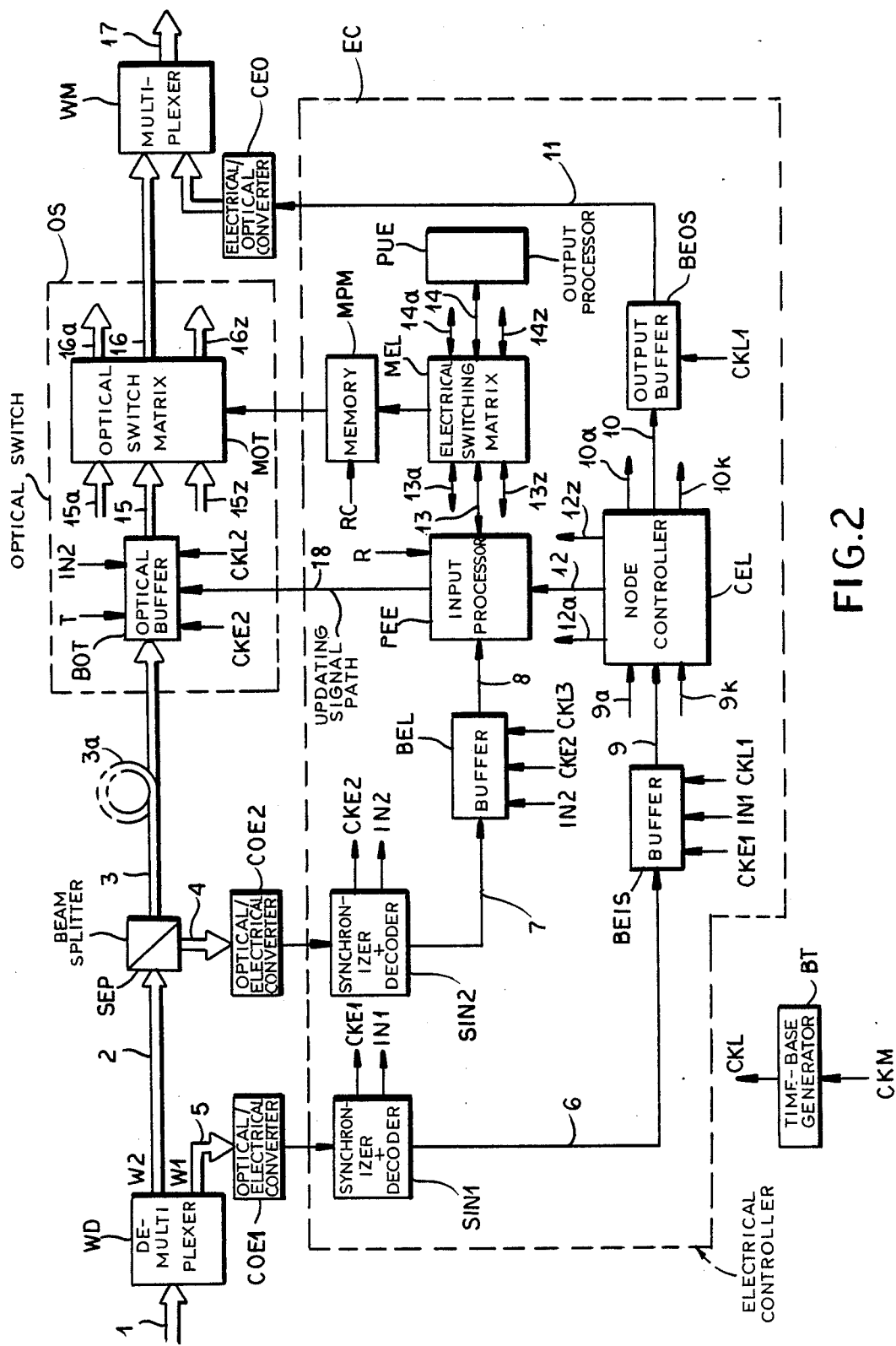
FIG. 2 is a block diagram of a node according to the invention.

As is shown in FIG. 1, a fast packet-switching network can be considered as formed by a number of transit nodes NT1 ... NTn, associated each with a number of local nodes connected thereto by optical fiber connections. For drawing simplicity only two local nodes NL1i and NLnj, connected to NT1 and NTn, respectively, are represented and discussed in detail. The terminals generating packetized information, transmitted as optical signals, are connected to the local nodes through multiplexing/demultiplexing systems. Always for drawing simplicity, only multiplexing/demultiplexing systems MD1, MDn associated with nodes NL1i and NLnj, respectively, and only terminals T1x, Tny connected to MD1 and MDn, respectively, are represented. Connections between terminals and multiplexing/demultiplexing systems are connections at relatively low speed, while connections among nodes and between the nodes and blocks MD are high-speed connections. In the structure proposed, relatively low speeds can be speeds up to one hundred of Mbit/s, while the high speeds can be speeds ranging from some hundred Mbit/s to some Gbit/s.

Each packet comprises, in addition to the actual information content, a header containing, i. a.: an indication of packet beginning; an indication of the type of packet (signalling, information, . . . ); a protection field for the header; a label (geographic label) characterizing the communication and updated at each node; the so called "routing tag" for the routing inside the node.

Information and signalling packets can be transmitted at different wavelengths and possibly at different speeds. Some input/output lines in a node might carry only information packets, others only signalling packets, still others both packet types.

As indicated for node NL1i and as will be seen in more details hereinafter, the nodes comprise an optical switching part OS and an electrical control part EC. The optical switching part OS switches only information packets. The electrical control part processes the signalling packets and the information packet headers: more particularly, it updates the label and builds up the routing tag.

Signalling processing in a node is effected in a centralized way, while information packet headers are processed in a distributed way, in an independent manner for each switching matrix input. Besides, as to the routing through the node, a solution has been adopted wherein such routing is searched for through an electrical switching matrix, which preferably has the same topology as the optical matrix: the configuration taken by the electrical matrix is then reproduced identical in the optical matrix.

It is still to be noted that the optical switching part can operate either synchronously or asynchronously. In the first case there are cycles with constant duration, during which first the electrical switching matrix (and hence the optical one) is set, and then all packets for which a path through the node has been found are transmitted at the same time. The packets which could not be forwarded are queued in node input buffers. Obviously suitable strategies will be adopted to prevent a packet from being delayed indefinitely. In the second case the individual elements of the switching network will be associated with buffers where the packets which cannot reach the desired output of the element itself will be queued, as well as processing means for managing said buffers. The difficulty of implementing a switching network with distributed memories and optical processing capacity, has induced me to choose the synchronous operation for the present invention.

FIG. 2 shows the node structure, in the most general case in which the input lines convey both signalling packets transmitted at a wavelength W1 and information packets transmitted at a wavelength W2. The different packet types are transmitted at different speeds. For drawing simplicity a single input line 1 and a single output line 17 have been shown. Double lines indicate optical signal paths, while single lines indicate electrical signal paths.

Each input line 1 of a node arrives at a respective wavelength demultiplexer WD which separates signalling packets from information packets and forwards the former on line 5 and the latter on line 2.

Signalling packets on line 5 are converted into electrical signals by an optical-to-electrical converter COE1 and hence are sent to signalling processing devices in electrical control equipment EC. Information packets on line 2 arrive at a beam splitter SEP which shares the power associated with the optical signals between line 3, leading to optical switching devices OS, and line 4, leading to an optical-to-electrical converter COE2 and hence to devices for processing information packet headers in electrical control equipment EC. At the node output, a wavelength multiplexer WM recombines into a single optical packet flow, on line 17, packets outgoing from OS as well as packets arriving from EC, converted again into optical form by an electrical-to-optical converter CEO.

Optical switching devices OS comprise the actual switching matrix MOT and an optical buffer BOT for each input for switching matrix MOT; the buffers temporarily store information packets to be switched through MOT.

The electrical control EC comprises two groups of devices processing the signalling packets and the information packet headers, respectively.

The first group of devices, inserted between COE1 and CEO, comprises:

a synchronization device SIN1, which extracts from the arriving signalling packet flow timing signals CKE1 for signalling packet acquisition by the node, and recognizes the beginning of each such packet, generating signal IN1;

a buffer BEIS temporarily storing the signalling packets, emitted by SIN1 on connection 6;

a node controller CEL, for the electrical processing of the signalling packets present on line 9 outgoing from BEIS;

an output buffer BEOS storing signalling packets emitted by CEL on output 10, before the packets are forwarded onto line 11 towards electrical/optical converter CEO, multiplexer WM and line 17.

The devices processing information packet headers comprise:

a synchronization and decoding device SIN2, identical to synchronizer/decoder SIN1; synchronizer/decoder SIN2 emits timing signals CKE2, IN2 which have for the information packets the same functions as CKE1, IN1.

a buffer BEL, temporarily storing the headers of the information packets, present on line 7 outgoing from SIN2;

a first processing unit PEE (input processor), performing the processings of information packet headers required for packet switching in the node, on the basis of the information supplied by mode control CEL through connection 12;

an electrical switching matrix MEL, topologically identical to optical switching matrix MOT, which is used in the routing search;

memory MPM, storing the configuration taken at each network cycle by electrical switching matrix MEL and controlling accordingly the setting of optical switching matrix MOT;

a second processing device PUE (output processor), recognizing that a connection has been set up between an input and an output of electrical switching matrix MEL and forwarding a packet acknowledging the occurred connection to input processor PEE associated to that input.

Controller CEL in unique for the whole switching node: supposing the z input/output lines, k of which carry both information and signalling packets, are connected to the node, reference numerals 9a . . . 9k, 10a . . . 10k denote the connections of CEL with the k branches comprising each of the devices COE1, SIN1, BEIS and respectively BEOS, CEO, handling signalling packets; reference characters 12a . . . 12z denote the connections with the z branches comprisig each of the devices SEP, COE2, SIN2, BEL, PEE, PUE, BOT handling the information packets.

Also matrices MOT, MEL, and memory MPM are unique; the matrices have z inputs/outputs indicated in FIG. 2 by 13a . . . 13z, 14a . . . 14z (for matrix MEL) and 15a . . . 15z, 16a . . . 16z (for matrix MOT).

The node also comprises a time base BT extracting from a main clock signal CKM (node clock) the local signals necessary to time the various operations in the node. At the output from the time-base generator BT the whole of the local signals is shown at CKL. At the inputs to the various blocks there are explicitly indicated signals CKL1, CKL2, CKL3, RC, T, R used respectively for: timing reading in buffer BEIS and writing/reading in buffer BEOS; timing reading in BOT; timing reading in BEL; reproducing into MOT, through MPM, the configuration of MEL; starting optical packet transmission through matrix MOT; starting the setting of electrical matrix MEL.

Signals CKE1, CKE2, which are directly extracted from packet flows on lines 5, 2 by devices SIN1, SIN2, by exploting synchronization packets or synchronization information contained in signalling/information packet headers, are used as synchronization signals for writing into input buffers BEIS and respectively BOT, BEL.

CKL1 and CKL2 are signals at the same rate as CKE1 and respectively CKE2. CKL3 is a slower signal, as will be seen hereinafter.

The optical switching matrix MOT is made of two-input and two-output switching elements, which are capable of switching packets having a length e.g. of the order of one thousand bits and are connected so as to form a self-routing network suitable for a fast packet-switching system with Delta or Omega topologies.

Optical buffer BOT loads the bits of an information packet starting from the instant of recognition of the packet beginning (signal IN2) and with the timing established by CKE2. After the header has been updated by PEE, the information stored in BOT is read with the timing established by CKL2. Taking into account that writing into BOT can start after recognition in SIN2 of the packet beginning, a delay line is conveniently inserted along line 3, leading to BOT optical packets to be memorized. The delay line is schematized by loop 3a and is made for instance by a winding of the same fiber which forms line 3. Memory BOT can be made of a group of bistable lasers and directional couplers, driven by input processor PEE. The use of bistable lasers as memory elements and their command by electrical signals is described e.g. in the paper "An experiment on high speed optical time-division switching" by S. Suzuki et al., Journal of Lightwave Technology, Vol. LT-4, No. 7, Jul. 1986.

Electrical buffers BEIS and BEOS are wholly conventional and have each capacity which is multiple of the signalling packet length (of the order of 100-300 bits). The electrical buffer BEL, this too conventional, has a capacity which is multiple of the length of the packet header (e.g. 32 bits).

In put processor PEE has the typical tasks of similar devices in already proposed fast packet-switching networks. More particularly PEE updates the label in the optical packet stored in BOT and builds the routing tag in the electrical "header packet", on the basis of the information supplied by CEL. The tasks of PEE are described in greater details e.g. in the paper "Fast packet-switching technique in first generation ISDN", presented by C. Demichelis, G. Giandonato, S. Giorcelli and R. Melen at the International Switching Symposium ISS '87, Phoenix (U.S.A.), 15-20 Mar. 1987.

Matrix MEL is based on topologies proposed for fast packet-switching networks and preferably it is topologically identical to MOT. It will consist of switching elements of considerably smaller capacity than that required for the elements of MOT, since they are to switch only the packet headers. Therefore, MEL can operate at a much lower speed than MOT and it is timed by signal CKL3, and not by signal CKL2 representing the line speed. e.g., if the optical transmission takes place at a speed of the order of some hundred Mbit/s, the speed required in MEL can be of some tens Mbit/s. The routing path for each packet is built through MEL, as in a conventional network, and is then reproduced in MOT.

Memory MPM comprises a position for each switching element in MEL and, as the various elements in MEL become set, such a position will store the bit indicating the configuration taken by the corresponding element of MEL. Block MPM comprises also the drivers necessary to transform the logic signals stored therein into signals having the power necessary to drive the elements of MOT.

The output processor PUE can consist of a read only memory, whose reading command is associated with the "header packet" arrival at the output of MEL associated therewith.

All other node blocks carry out functions well known in the art, and hence further information is unnecessary.

Figure 4:
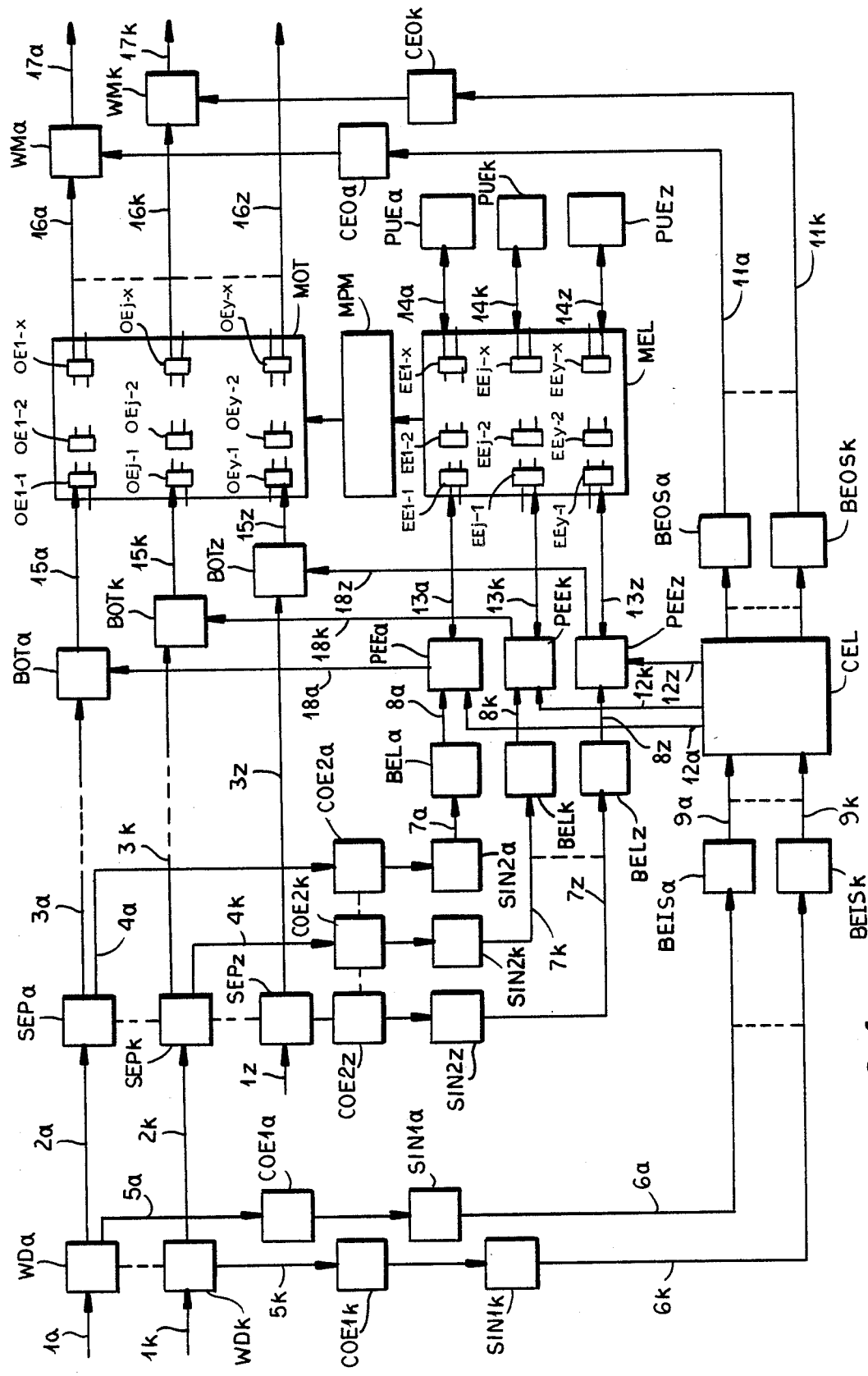
FIG. 4 is a block diagram similar to FIG. 2 but wherein a group of nodes has been illustrated together with the switching matrix having a number of stages, etc.

FIG. 4 illustrates the system of FIG. 2 as applied to a system with a multiplicity of nodes. In this FIGURE, elements corresponding to those of FIG. 2 are designated with an "a" suffix for the first node, a "k" suffix for intermediate nodes and a "z" suffix for the last node or group of the system.

FIG. 3 shows the subdivision of an operating cycle of the node in the case disclosed of distributed routing control and of synchronous operation. As shown, basically three time phases can be recognized:

in the first phase, which lasts from instant t0 of cycle beginning until an instant t1, the operations necessary to set MEL and to update the packet header in BOT take place. The phase duration is Te.(Lh+S), where Te is the duration of an electrical bi, Lh is the length of the packet header, expressed as number of bits, and S is the number of stages in MEL;

the second phase, t1—t2, is devoted to transmission from PUE to PEE of the acknowledgment packet. The duration of the second phase is Te.(La+S), where La is the length in bits of the acknowledgment packet, and Te, S have the meaning said above. In this second phase also the setting of MOT will be effected:

the third phase, from t2 to the cycle end t3, is devoted to the transmission of packets stored in memories BOT through the matrix; this phase will have a duration To.Lp, where To is the duration of an optical bit and Lp is the length in bits of the packets to be switched.

It is to be noted that while a packet is being transmitted, the acquisition of the following packet present on the same node input and the label processing can start. Network cycles can then overlap. Besides, suitable guard times between the various phases will be provided.

The node operation will be now described with reference to the diagram of FIG. 3.

A packet arriving on line 1 (FIG. 2) can be a signalling or an information packet. It has been assumed that the packet is modulated in the first case at wavelength W1 and in the second case at a wavelength W2 different from W1. The wavelength demultiplexer WD placed at the node input forwards the packet on line 5, if it is a signalling packet, or on line 2, if it is an information packet.

Considering first the signalling packets, these packets, after conversion into electrical signals in optical/electrical converter COE1, are temporarily stored in memory BEIS (enabled by signal IN1 emitted by SIN1) to be subsequently processed by CEL. As mentioned above, the storage in buffer BEIS is timed by CKE1 while the transfer to mode controller CEL is timed by CKL1. Signalling processing, which does not differ from the processing in any electrical fast packet-switching network, results in the generating of new signalling packets or in the transmission of the received packet to another network node. In any case the signalling packets outgoing from node controller CEL are stored in memory BEOS (with the timing established by CKL1) and then they are extracted therefrom, converted by electrical-/optical converter CEO into optical signals at wavelength W1 and wavelength multiplexed with the optical information packets at wavelength W2 coming from line 16.

Signalling processing is not concerned by the present invention and hence it will not be described further.

When an information packet arrives, it is forwarded by multiplexer WD onto line 2 and duplicated by beam splitter SEP. The packet on line 3 is stored in the optical buffer BOT, while the packet on line 4 is converted into electrical signals and transferred to synchronizer/decoder SIN2; synchronizer/decoder SIN2 recognizes the packet beginning and enables storage into buffers BOT and BEL. More particularly, only the packet header is to be loaded into BEL. The packet is loaded into buffers BOT and BEL with timing CKE2 extracted from the arriving information packet. Since buffer BEL is to store only the header, while loading into buffer BOT is being completed, the packet header is already available to input processor PEE, which can then start its operations.

The processing devices (PEE) of the first group are connected to the centralized controller (CEL) from which they receive information necessary to update the information packet header and to build therein a routing tag for the routing through the electrical switching matrix (MEL), the header updating being effected directly in the optical packets contained in said buffers (BOT) via line 18.

Input processor PEE receives from node controller CEL, through connection 12, the information relevant to the communication which the packet refers and on the basis of such information it replaces the input label by the output label in the optical packet stored in buffer BOT and builds the routing tag in the electrical "header packet" read from output buffer BEL with the timing established by CKL3 and supplied to input processor PEE through line 8. The modified electricl "header packet" is sent through self-routing network MEL (operation started by signal R) and, as the individual elements of MEL become set in the manner indicated by the routing tag bits, the configuration of the individual elements (crossed, straight) is stored into MPM.

The same operations are carried out in parallel for all other node inputs.

Whatever the result of the search for a routing path, at instant t1 (FIG. 3), the operations related to the setting of electrical matrix MEL (FIG. 2) are over and reading command RC for memory MPM can be emitted in order to set optical matrix MOT.

Supposing that a routing path has been found for the "header packet" considered, at instant t1 such a packet is present on an output of electrical matrix MEL and enables output processor PUE to start backwards transmission of the acknowledgment packet via the same path followed by the "header packet". When input processor PEE has received such a packet (instant t2), the reading of the whole information packet stored in buffer BOT can be enabled (signal T), and the packet is transferred to line 17 through optical matrix MOT and multiplexer WM. At the same time all other optical packets for which a routing path through electrical matrix MEL has been set up, are read. While an optical packet is transmitted through network MOT, the operations concerning acquistion of the following packet can begin.

It s worth noting that the packets arrive at the various node inputs at random instants. In a cycle, only the packets whose headers have been completely loaded into buffers BEL and have been processed within the proper time phase will be transmitted optical matrix MOT; the others will be read in the subsequent cycles.

It is clear that what described has been given only by way of non limiting example and that variations and modifications are possible without going out of the scope of the invention. Thus, even if it has been implicitly supposed that devices PEE, PUE are associated with each input/output of electrical matrix MEL, it is evident that their number can be lower than that of the inputs/outputs of electrical matrix MEL, since a same device PEE or PUE can serve a group of inputs or respectively outputs of electrical matrix MEL. Besides, it is evident that the lines which carry only information packets will be directly connected to devices SEP, while the lines which carry only signalling packets are directly connected to converter COE1: in both cases device WD is unnecesary, as it is unnecessary device WM on the output lines conveying an only type of packet. Further, even though in the example described an electrical matrix MEL topologically identical to optical matrix MOT has been considered, matrices with different topologies can be used: e.g. matrix MEL can have greater dimensions, but a topology allowing a faster setup.

I claim:

1. A node for a fast packet-switching network in optical-electrical technology, wherein switching takes place on the basis of routing information contained in a header of each of a succession of packets, comprising:
    an optical switching matrix having a plurality of stages, each comprising a plurality of switching elements, for switching optical information packets transmitted as optical signals;
    an electrical switching matrix for searching a routing through the node from information contained in the headers of the information packets and converted into electrical form; the configuration taken by the electrical switching matrix;

a first group of processing devices associated with the inputs of the electrical switching matrix for the electrical processings of information packet headers necessary to each for a connection path between an input and an output of the electrical switching matrix and for updating the headers in the optical information packets;

a second group of electrical processing devices associated with outputs of the electrical switching matrix for recognizing that a connection has been set up between an input and an output of the electrical switching matrix and forwarding a packet acknowledging such setup to the processing devices of the first group; and a centralized node controller for the electrical processing of signalling packets.

2. A node as defined in claim 1, wherein the electrical switching matrix comprises the same number of stages and the same number of elements as the optical switching matrix and is topologically identical thereto.

3. A node as defined in claim 1 wherein each input of the optical switching matrix is connected with an optical buffer for temporarily storing the packets to be optically switched for the time necessary to search for and set up a connection path between an input and an output of the electrical switching matrix and to set up the optical switching matrix, the packets stored in all buffer being read at a same time instant.

4. A node as defined in claim 2 wherein said processing devices of the first group are connected to the centralized controller from which they receive information necessary to update the information packet header and to build therein a routing tag for the routing through the electrical switching matrix, the header updating being effected directly in the optical packets contained in said buffers.

5. A node as defined in claim 1 wherein a memory is connected between the electrical and the optical switching matrixes to store information in electrical signal form indicating a configuration of elements of the electrical switching matrix, said information being transferred to homologous elements of the optical switching matrix as a setting command.

6. A node as defined in claim 1 further comprising synchronization means for extracting from the arriving packet flow timing signals for packet acquistion by the node.

7. A node as define in claim 1, further comprising a local time base generating timing signals for the various devices in the node and organizing the switching operations in the node into working cycles of constant duration and comprising a first phase wherein the electrical switching matrix is set and the headers of the packets present in the optical buffers are updated, a second phase in which the optical switching matrix is set and the processing devices of the second group send to the processing devices of the first group packets acknowledging that a connection has been established between a node input and output, and a third phase in which optical packets for which a routing path through the node has been found are forwarded through the optical matrix to node outputs.

8. A node as defined in claim 1 wherein signalling packets and information packets present on a common input/output line of the node are transmitted with different wavelengths.

9. A node as defined in claim 8 wherein input/output lines of the node, which convey both packet types, are provided with means for recognizing information packets and signalling packets and sending the former towards the optical switching matrix and the first group of processing devices and the latter towards the centralized controller (CEL), and respectively with means for recombining the packets switched by the optical matrix and the signalling packets emitted by the centralized controller into a single flow of optical packets.

10. A node as defined in claim 6 wherein the synchronization means comprises a first synchronization device for recognizing the beginning of each signalling packet and extracting from the signalling packet flow timing signals for signalling packet acquistion by the node and a second synchronization device for recognizing the beginning of each information packet and extracting from the information packet flow timing signals for information packet acquisition by the node.

11. A node as defined in claim 7 wherein information and signalling packets present on a same input/output line of the node are transmitted at different speeds.

* * * * *